M. P. SHEIMAN.
UTENSIL.
APPLICATION FILED MAY 17, 1915.
1,183,126.
Patented May 16, 1916.
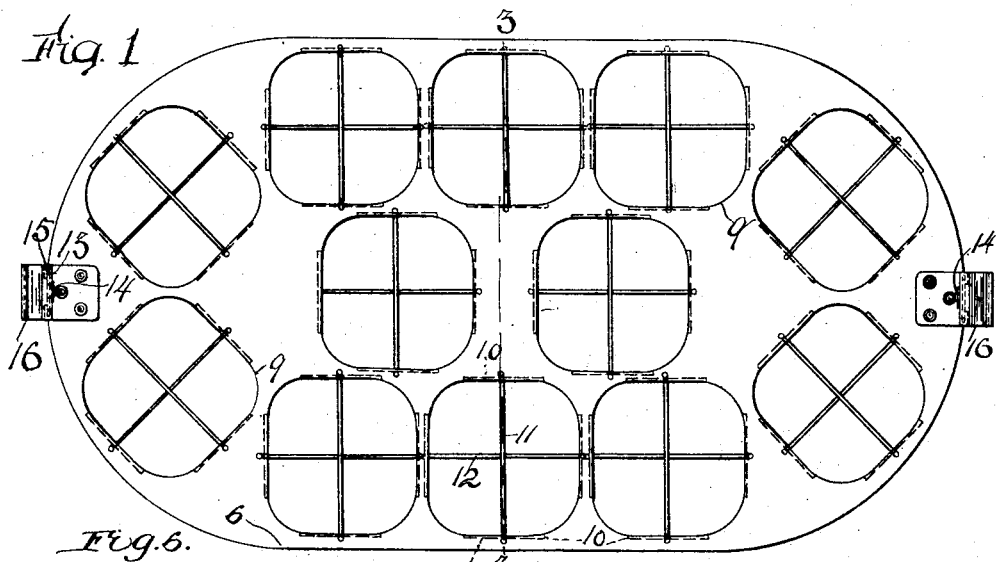
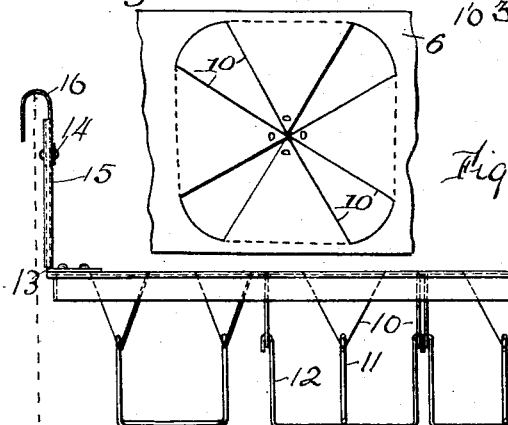
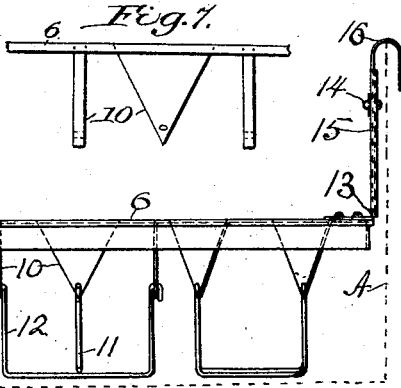
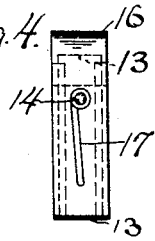
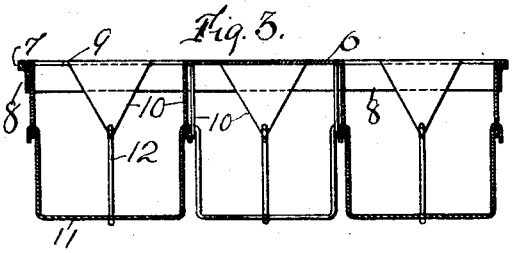
Witnesses:
Leigh W. Hunt
Esther C. Murphy
Inventor:
Maurice P. Sheiman
THE COLUMBIA PLANOGRAPH CO., WASHINGTON, D. C.

UNITED STATES PATENT OFFICE.

MAURE P. SHEIMAN, OF CLAREMONT, NEW HAMPSHIRE.

UTENSIL.

1,183,126.     Specification of Letters Patent.     Patented May 16, 1916.

Application filed May 17, 1915. Serial No. 28,652.

*To all whom it may concern:*

Be it known that I, MAURE P. SHEIMAN, a subject of Russia, residing at Claremont, in the county of Sullivan and State of New Hampshire, have invented a certain new and Improved Utensil, of which the following is a specification, reference being had to the accompanying drawings, forming part thereof.

This invention has reference to improvements in utensils and particularly to utensils adapted to sustain jars or other containers for fruit or vegetables in boilers during culinary operations.

The object of this invention is to provide utensils of simple but strong construction adapted to be placed in suitable boilers containing water and having means to sustain a series of jars in such manner that said jars are immersed in the water and are held from contact with each other.

Another object of the invention is to so construct a utensil of the nature herein described that certain members thereof may swing toward the main member to reduce the gross dimensions of the utensil for storage purposes.

Other objects of the invention will appear from the following description.

The invention consists in the novel construction of the improved utensil as shall hereinafter be more fully described and pointed out in the claims.

Figure 1, represents a plan view of the improved utensil. Fig. 2, represents a side elevation of the same shown in relation to a boiler the latter being indicated in dotted lines. Fig. 3, represents a cross sectional view taken on line 3—3 Fig. 1. Figs. 4 and 5 represent detail views of one of the sustaining hooks. Fig. 6, represents a plan view of a part of the plate 6 before the ears 10, 10 are bent down therefrom. Fig. 7, represents a side elevation of Fig. 6, showing the ears 10, 10 bent to their final position.

Similar characters of reference designate corresponding parts throughout.

In carrying this invention into practice I take a sheet of metal of any kind and of suitable thickness and cut and shape the same to constitute the main frame plate 6 preferably of the general shape shown in Fig. 1 and of a size to be received by any ordinary vessel or boiler. In order to strengthen said main frame plate 6 I bend the edge thereof downward and inward upon itself as at 7 and then again downward as at 8, Figs. 2 and 3. This main plate 6 has the series of openings 9, 9 of a size and shape to receive suitable jars or containers and having at their edges integral ears 10, 10 bent downward at right angles to the plates 6 to constitute flat side bearings for the jars or containers received by the openings 9, 9. In order to provide such openings 9, 9 in said plate 6 I cut out and remove portions of the material of plate 6 between the lines of the ears 10, 10 as shown in Fig. 6 and then bend said ears 10, 10 approximately at right angles to said plate 6 as shown in Figs. 2, 3 and 7. Said ears 10, 10 are arranged in pairs and to each pair of said ears is pivotally connected the wire frame 11 or 12 as the case may be. The side arms of the frames 11 are shorter than the side arms of the frames 12 whereby the frames 11 may swing within the frames 12 and thus the pairs of frames 11 and 12 may swing from the positions shown in Figs. 1, 2 and 3 toward the plate 6.

Provision is made to suspend the plate 6 and its mechanism in a suitable boiler, indicated at A Fig. 2, and such suspending means preferably comprises two or more members 13 mounted on the plate 6 and a stud 14; on said member 13 is slidably mounted the guide 15 having the hook member 16 and the slot 17 having the offset 18. The slidable guide 15 has sufficient lateral movement on the member 13 to permit the disengagement of the offset 18 from the stud 14 of said member 13 whereby the sustaining device comprising the member 13 and the slide 15 may be lengthened to the position shown in Fig. 4. By such adjustment of the sustaining means the plate 6 may be adjusted relative to the depth of the boiler or to the depth of water in the boiler.

It is obvious that the size, shape and general arrangement of the openings 9, 9, will depend somewhat on the size and shape of the jars, cans or other containers to be used with this improved utensil but it is evident that jars or containers considerably smaller and differing in shape from the openings 9, 9, may be used with this utensil, in view of the presence of the wire frames 11, 12 which are adapted to sustain said jars or containers.

In use jars or other containers are placed in the several openings 9, 9 and are sustained by the wire frames 11, 12, the utensil, with such jars or containers is then placed in the boiler A or some similar vessels containing water and the utensil is suspended by the engagement of its hooks 16, 16 with some portion or member of the boiler. During the culinary operation the jars or containers are thus suspended in the water without danger of contact between the jars or containers and resulting breakage and, when open jars or containers are used, without danger of upsetting the same from the circulation or ebullition of the water.

Having thus described my invention I claim as new and desire to secure by Letters Patent:

1. A utensil of the nature described comprising a sheet metal plate having a series of openings and pairs of integral ears bent from the edges of said openings, and wire loop frames each of which is pivotally mounted in a pair of said ears.

2. A utensil of the nature described comprising a sheet metal plate having a series of openings and pairs of integral ears bent from the edges of said openings, the edge of said plate bent upon itself and downward to constitute a stiffening flange, pairs of crossed frames pivotally mounted in said ears to swing crosswise of said openings, and means for adjustably sustaining said plate in a boiler.

MAURE P. SHEIMAN.